(12) United States Patent
Etou et al.

(10) Patent No.: US 7,837,252 B2
(45) Date of Patent: Nov. 23, 2010

(54) POWER BACK DOOR FOR VEHICLE

(75) Inventors: Shinsuke Etou, Aichi (JP); Ryuji Fukui, Aichi (JP); Takayuki Fukuda, Aichi (JP); Kunihiko Sugiyama, Aichi (JP)

(73) Assignee: Toyota Shatai Kabushiki Kaisha, Aichi (JP)

( * ) Notice: Subject to any disclaimer, the term of this patent is extended or adjusted under 35 U.S.C. 154(b) by 0 days.

(21) Appl. No.: 12/310,901

(22) PCT Filed: Oct. 24, 2007

(86) PCT No.: PCT/JP2007/070713
§ 371 (c)(1),
(2), (4) Date: Jul. 9, 2009

(87) PCT Pub. No.: WO2008/108028
PCT Pub. Date: Sep. 12, 2008

(65) Prior Publication Data
US 2010/0007170 A1    Jan. 14, 2010

(30) Foreign Application Priority Data
Mar. 6, 2007    (JP) ............................ 2007-055066

(51) Int. Cl.
*B60J 5/00*    (2006.01)
(52) U.S. Cl. .................... 296/146.4; 296/146.9; 296/56; 49/344; 49/346
(58) Field of Classification Search .............. 296/146.8, 296/146.4, 56, 146.9; 49/339, 344, 346, 49/340, 341
See application file for complete search history.

(56) References Cited

U.S. PATENT DOCUMENTS

| | | | | |
|---|---|---|---|---|
| 1,037,631 | A * | 9/1912 | Jones | ........................... 74/566 |
| 6,401,392 | B1 * | 6/2002 | Yuge | ........................... 49/340 |
| 6,776,448 | B2 * | 8/2004 | Matsui et al. | ............ 296/146.4 |
| 7,063,373 | B2 * | 6/2006 | Chikata et al. | ........... 296/146.4 |
| 7,370,905 | B2 * | 5/2008 | Watanabe | ................. 296/146.4 |

FOREIGN PATENT DOCUMENTS

| | | |
|---|---|---|
| JP | 2003-336448 A | 11/2003 |
| JP | 2004-230993 A | 8/2004 |
| JP | 2006-231970 A | 9/2006 |

OTHER PUBLICATIONS

International Search Report mailed on Jan. 29, 2008 for the corresponding International patent application No. PCT/JP2007/070713 (English translation enclosed).

* cited by examiner

*Primary Examiner*—Joseph D Pape
(74) *Attorney, Agent, or Firm*—Posz Law Group, PLC

(57) ABSTRACT

An opening, through which a connection section between a drive arm and a rod of a power back door enters and exits, is covered with cover members to improve external appearance, and interference between the connection section and the cover members is eliminated when the connection section passes through the opening to prevent abnormal noise and damage to the cover members during the passage of the connection section. A pair of cover members 6a and 6b are provided along right and left vertical edges of a vertically long opening 50 that is formed in a side edge defining a door opening 1, through which a connection section S between a drive arm 3 and a rod 4 of a power back door for automatically driving a back door 2 adapted to close and open the door opening 1 can enter and exit, such that lip-shaped end edges thereof face and contact each other. The cover members 6a and 6b are gradually expanded in width so that they have a greater width on the lower side thereof, and a contacting position is shifted downwardly and inwardly of the opening 50, thereby forming an entrance/exit opening 64 surrounded by lower edges of expanded sections of the cover members 6a and 6b, through which the connection section S enters and exits.

4 Claims, 4 Drawing Sheets

POWER BACK DOOR FOR VEHICLE

CROSS REFERENCE TO RELATED APPLICATIONS

This application is a U.S. national stage application of PCT/JP2007/070713 filed on Oct. 24, 2007, and claims priority to, and incorporates by reference, Japanese Patent Application No. 2007-055066 filed on Mar. 6, 2007.

TECHNICAL FIELD

The present invention relates to a hatchback-type back door for opening and closing a door opening provided in a back surface of a vehicle body and, more particularly, to a power back door for a vehicle, in which the hatchback-type back door can be automatically driven with a drive device.

BACKGROUND ART

As shown in FIG. 4, a door opening 1 in a back surface of a body of a vehicle such as a wagon type vehicle, SUV, etc. is opened and closed with a hatchback-type back door 2. In one example of the conventional hatchback-type back door 2, the back door 2 is automatically opened and closed with a drive device D, which is called "power back door" (See Patent documents 1 and 2, for example).

In the power back door of this type, the drive device D provided on an interior side of a rear pillar P along a door opening is connected to the back door 2 via a drive arm 3 and a rod 4. The drive arm 3 is provided in the drive device D to turn upwardly and downwardly, and the rod 4 is connected to an end of the drive arm 3 and extends upwardly. By moving the rod 4 upwardly and downwardly with the turning of the drive arm 3 about a turning shaft 30, the back door 2 is opened and closed. Patent documents 1 and 2 also disclose a control device adapted to prevent a door from colliding with obstacles upon the driving of the door with the drive device.

FIGS. 5 and 6 illustrate a typical example of a conventional structure of a connection section S between the drive arm 3 and the rod 4 of the power back door along with an area surrounding the same. Generally, in the connection section S, a spherical shaft projects from an end of the drive arm 3 and is tiltably fitted in a hemisphere-shaped bearing provided in the rod 4. And the drive device D and the drive arm 3 are covered with a pillar garnish 5 composed of a synthetic resin plate, similarly to an interior surface of a rear pillar P.

The pillar garnish 5 is cut along a rear end edge 52 to define an opening 50 along with a rear end edge of the rear pillar P. The opening 50 opens rearwardly with a vertically long configuration, and allows the entrance and exit of the connection section S between the drive arm 3 and the rod 4 (in the directions shown by arrows Y in FIG. 6). A cover member 9 is provided to close the opening 50 while allowing the turning of the connection section S. The cover member 9 is composed of a rubber plate or a synthetic resin plate exhibiting a rubber-like elasticity. An outer peripheral part 90 thereof is bonded to a peripheral edge of the pillar garnish 5, and a lip part 91 thereof contacts the rear end edge of the rear pillar P When the back door 2 is closed, the drive arm 3 is accommodated in the vehicle compartment with the end thereof directed downwardly. When the back door 2 is opened, the drive arm 3 turns upwardly, and the connection section S between the end of the drive arm 3 and the rod 4 passes the vicinity of a lower end of the opening 50, and projects rearwardly and outwardly of the vehicle body. And the connection section S pushes the lip part 91 of the cover member 9 and enlarges a slit 93 formed in a lower end of the lip part 91 to be separated from the outer peripheral part 90 of the cover member 9. When the back door 2 is fully opened, the drive arm 3 reaches the vicinity of an upper end of the opening 50, and the connection section S projects outwardly of the vehicle body via a cut part 92 provided in an upper half of the cover member 9.

Patent Document 1: Japanese patent application laid-open No. 2003-336448

Patent Document 2: Japanese patent application laid-open No. 2004-230993

DISCLOSURE OF THE INVENTION

Problem to be Solved with the Invention

In the conventional cover member 9, however, when the door is in the open state, the inside of the opening 50 is visible from the cut part 92 so that the appearance around the opening 50 is not good. The connection section S between the drive arm 3 and the rod 4 has a large width so that when the connection section S turns (in the directions shown by arrows in FIG. 6), the lip part 91 on the turning locus of the connection section S is pushed thereby to be greatly flexed outwardly or inwardly of the vehicle body. Therefore, there occur the problems that the inside of the opening 50 is visible via a gap along the lip part 91, and that noise is generated when the lip part 91 returns from the pushed state after the passing of the connection section S. In addition, the cover member 9 may be damaged and broken due to the flexing thereof, which is caused by the interference with the connection section S every time the door is opened and closed.

Accordingly, the present invention has been made to provide a power back door with good external appearance by covering an opening, through which a connection section between a drive arm and a rod of a power back door enters and exits in the open state of the back door, while eliminating interference between the connection section and a lip part of a cover member when the connection section passes the cover member, and consequently, preventing damage to the lip part and generation of noise upon the returning of the lip configuration.

Means for Solving the Problems

In accordance with the present invention, in a power back door for automatically driving a hatchback-type back door for opening and closing a door opening provided in a back surface of a vehicle body with a drive device, the power back door is connected to the drive device with a drive arm that is turned upwardly and downwardly by the drive device and a rod that is tiltably connected to an end of the drive arm, and when the door is opened and closed, a connection section between the drive arm and the rod enters and exits from a vertically long opening formed in a side edge part defining the door opening, a pair of cover members, each having a lip-shaped end edge, are provided along right and left vertical edges of the vertically long opening such that lip-shaped end edges of the cover members face and contact each other. The cover members are gradually expanded in width so that they have a greater width on the lower side, a contacting position of the end edges of the cover members shifts downwardly and inwardly of the vertically long opening, and an entrance/exist opening through which the connection section enters and exits is defined with lower edges of expanded sections of the cover members (claim 1).

Since the cover members are respectively provided along each of right and left vertical edges of the opening, and the lip-shaped end edges thereof face and contact each other, the inside of the opening is not visible to provide a good appearance. In addition, since the width of each of the cover members is gradually expanded so as to have a greater width on the lower side thereof, the contacting position of the end edges of the cover members shifts inwardly to define an entrance/exit opening with the lower edges of the cover members for passing the connection section between the drive arm and the rod. Therefore, the connection section is prevented from contacting the cover members, thereby preventing the occurrence of noise and the damage to the cover members, which have been encountered with the conventional structure when the connection section passes the opening. The entrance/exit opening opens upwardly and downwardly so as not to degrade the appearance thereof.

Lower halves of the cover members are gradually expanded in width so that they have a greater width on the lower side thereof, and the entrance/exit opening is formed between the lower edges of the cover members and a lower edge of the opening (claim 2). The lower edges of the cover members, each protruding inwardly of the opening, and the lower edge of the opening define the entrance/exit opening.

The cover members respectively have a base part that is attached along each of the right and side vertical edges of the opening to extend inwardly of the vertically long opening in parallel to each other, and a lip part that bends from an end edge of the base part and extends so as to face each other, thereby defining a generally L-shaped cross-section. The base parts in the lower halves of the cover members are gradually expanded in width so that they have a greater width on the lower side thereof, and the entrance/exit opening with a generally rectangular configuration is formed between the lower edges of the cover members and the lower edge of the opening (claim 3). The opening area of the entrance/exit opening can be made large, which is preferable upon the passing of the connection section.

The cover members are composed of an elastic rubber material, and metal cores adapted to hold a configuration of the base parts are embedded therein (claim 4). The cover members are not distorted by virtue of the metal cores.

BEST MODE FOR CARRYING OUT THE INVENTION

Hereinafter, the present invention will be explained based on one embodiment wherein the power back door of the present invention is applied to a hatchback type back door 2 for opening and closing a door opening 1 provided in a back surface of a wagon type vehicle, a SUV, etc. shown in FIG. 4 upwardly and downwardly. The structure of a drive device D provided in the vehicle body for automatically driving the back door is substantially identical to the conventional one.

The drive device D is mounted on an interior surface of a rear pillar P, and includes an electric motor D1 and a gear box D2. A drive arm 3 is provided in the gear box D2 so as to turn upwardly and downwardly about a rotation shaft 30. A rod 4 is connected to an end of the drive arm 3 so as to tilt upwardly and downwardly.

An end of the rod 4 extends rearwardly and upwardly of a vehicle body and is turnably connected to one vertical edge of the door frame 21 around the door window opening 20 of the back door 2. When the electric motor D1 is driven, the drive arm 3 is turned with the gear box D2 to move the rod 4 upwardly and downwardly, whereby the back door 2 is automatically opened and closed. In FIG. 4, reference character 23 designates a gas damper adapted to support the back door 2 in the hatchback position when the back door 2 is opened.

FIGS. 1 through 3 show the connection section S between the drive arm 3 and the rod 4 along with the area surrounding the same. As shown in FIG. 1 through 3, the drive arm 3 is composed of a thick band-like metallic plate, and a shaft member 33 is provided at an end 31 of the drive arm 3. A base end of the shaft member 33 is fitted in an attaching hole provided at the end 31 of the drive arm 3 so as to project laterally therefrom, and a spherical part is provided at a projecting end thereof as a spherical shaft.

A base end 41 of the rod 4 has a bearing with a hemisphere configuration corresponding to the spherical part of the shaft member 33. The shaft member 33 of the drive arm 3 is engaged with the bearing of the base end 41 of the rod 4 to connect the drive arm 3 and the rod 4 so as to tilt upwardly and downwardly relative to each other.

The drive device D and the drive arm 3 are covered with a pillar garnish 5, similarly to an interior surface of the rear pillar P. The pillar garnish 5 is composed of a synthetic resin plate, and is provided so as to be spaced from the interior surface of the rear pillar P to define a space adapted to accommodate the drive device D and the drive arm 3 between the pillar garnish 5 and the interior surface of the rear pillar P. A rear end of the space is closed with a back surface 51 of the pillar garnish 5, which is bent toward the rear pillar P, and a rear end edge 52 of the pillar garnish 5 contacts a rear end edge of the rear pillar P. A weather strip W is provided along the rear end edge of the rear pillar P around the door opening 1.

The back surface 51 of the pillar garnish 5 has an opening 50 through which the connection section S between the drive arm 3 and the rod 4 enters an interior of the pillar garnish 5 and exits therefrom when the power back door is driven. The opening 50 is formed between the pillar garnish 5 and the weather strip W along the rear edge of the rear pillar P by cutting the rear end edge 52 of the pillar garnish 5. The opening 50 has a vertically long rectangular configuration, and when the door is opened, the drive arm 3 turns upwardly and the connection section S projects from an upper end of the opening 50 rearwardly and outwardly, and when the door is closed, the connection section S turns downwardly (downward direction of arrows Y in FIG. 1(B)), passes a lower end of the opening 50 and is accommodated within the garnish 5. The width of the opening 50 is made approximately equal from an upper end toward a lower end thereof.

Right and left cover members 6a and 6b are provided in the opening 50 so as to extend inwardly from right and left side edges thereof. The right and left cover members 6a and 6b are composed of rubber, and are extended from a frame member 60 secured to the back surface 51 of the pillar garnish 5. The right and left cover members 6a and 6b have base parts 61 projecting from right and left side frame 601 and 602 of the frame member 60 inwardly of the opening 50, and lip parts 62 bending from inner ends of the base parts 61 and projecting toward a center of the opening 50, thereby defining a generally L-shaped cross-section.

Metal cores 63, each being composed of a thin metallic plate, are embedded in the cover members 6a and 6b from side frames 601 and 602 to the base parts 61 to hold the configuration thereof. Ends of the lip parts 62 of the cover members 6a and 6b are respectively bent gently and tapered toward an inside of the opening 50, and made to contact each other in a generally widthwise center of the opening 50. The end 31 of the drive arm 3 is inserted between end edges of the lip parts 62.

In a lower half of each of the cover members 6a and 6b, which has a vertically long configuration along the opening 50, the inwardly projecting amount of the base part 61 is gradually enlarged downwardly, thereby gradually expanding the width of the cover members 6a and 6b to have a greater width on the lower side thereof. The metal cores 63 embedded in the base parts 61 are formed to have the configurations conforming to the base parts 61. As a result, the contacting position of the ends of the lip parts 62 gradually shifts along a downwardly and inwardly curving line.

The cover members 6a and 6b extend downwardly such that lower edges thereof face a lower edge of the opening 50, and the cover members 6a and 6b define a rectangular opening 64 that opens upwardly and downwardly with the lower edge (lower frame 604 of the frame member 60) of the opening 50, the base parts 61 of the cover members 6a and 6b and the lip part 62. The opening 64 is located on a turning locus of the connection section S to serve as an entrance/exit opening for the connection section S when the door is opened and closed. And the lip parts 62 of the cover members 6a and 6b, which partly define the opening 64, contact each other along a curving line conforming to the turning locus of the connection section S.

The cover members 6a and 6b are mounted by securing attaching parts 605 provided in one side frame 601, an upper frame 603, a lower frame 604 of the frame member 60, which are integrally formed with the cover members 6a and 6b, to a periphery of the opening 50 of the pillar garnish 5, and bringing the other side frame 602 of the frame member 60 into contact with the weather strip W as the rear edge of the rear pillar P.

When the back door 2 is opened and closed, the drive arm 3 turns upwardly and downwardly along the contacting position of the lip parts 62 of the right and left cover members 6a and 6b, and the connection section S between the drive art 3 and the rod 4 passes the entrance/exit opening 64 provided at the lower ends of the cover members 6a and 6b. In the open state of the backdoor 2, the drive arm 3 turned upwardly projects rearwardly of the lip parts 62 in the vicinity of the upper ends of the cover members 6a and 6b. And in the closed state (not shown) of the back door 2, the drive arm 3 turned downwardly is accommodated inside the pillar garnish 5, and a middle part of the rod 4 passes between the lip parts 62 of the cover members 6a and 6b.

In accordance with the present embodiment, the right and left cover members 6a and 6b are provided along right and left side edges defining the opening 50 so as to project towards a center thereof, and ends of the lip parts thereof are made to face and contact each other so that in the open state of the back door 2, the inside of the opening 50 is prevented from being visible from a rear side thereof to improve external appearance. In particular, since the drive arm 3 is made to pass between the lip parts 62 of the cover members 6a and 6b, even when the drive arm 3 is located in the upper position, or under turning, the band-like drive arm 3 flexes the right and left lip parts 62 only slightly, thereby preventing the inside of the opening 50 from being greatly exposed, as is different from the cut part 92 (FIG. 5 and FIG. 6) of the conventional cover member 9.

In addition, since the width of the lower half of each of the right and left cover members 6a and 6b is gradually expanded so as to have a greater width on the lower side thereof, and the facing and contacting position of the lip parts 62 is shifted inwardly of the opening 50 along a curving line, an entrance/exit opening 64 is defined between the lower edges of the opening 50 and the lower edges of the cover members 6a and 6b so as to open upwardly and downwardly. With this arrangement, the connection section S between the drive arm 3 and the rod 4 can be passed upwardly and downwardly through the thus provided entrance/exit opening 64 without being interfered with the cover members 6a and 6b. In addition, the entrance/exit opening 64 opens upwardly so as not to be seen from a back side of a vehicle body, whereby the external appearance is not degraded.

Since the connection section S does not contact the cover members 6a and 6b, and when the drive arm 3 passes therebetween, ends of the lip parts 62 are flexed by a merely small amount, noise is not generated and the cover members 6a and 6b are not damaged, as is different from the case of the conventional structure. Since the metal core 63 is embedded in the base part 61 of each of the cover members 6a and 6b, they can be prevented from being damaged with the passing of time.

In the above-described embodiment, the turning locus of the connection section S is arranged to pass the lower end of the opening 50, the lower half of each of the cover members is gradually expanded in width so as to have a greater width on the lower side thereof, and the entrance/exit opening 64 is defined between the lower edge of the opening 50 and the lower edges of the cover members 6a and 6b. But, the present invention is not limited to this embodiment. Alternatively, the turning locus of the connection section S may be arranged to pass a vertically middle position of the opening 50. In this case, each of the cover members 6a and 6b is made short such that a lower edge thereof is located on the vertically middle position of the opening 50 with a greater width, thereby defining the entrance/exit opening 64 with lower edges of the cover members. And a lower half of the opening 50 is closed with a cover plate provided separately from the cover members 6a and 6b.

In addition, in the above-described embodiment, the base part 61 and the lip part 62 are formed to have an L-shaped cross-section to define the entrance/exit opening 64 with a rectangular configuration, but the present invention is not limited thereto. The cover members may be respectively formed to have a flat lip-like configuration that extends diagonally towards a center and inside of the opening 50, and in this case, an entrance/exit opening for the passage of the connection section can be formed between the lower edge of the opening 50 and the lower edges of the cover members. However, in this case, the entrance/exit opening has a generally triangular configuration so that, considering the passing properties of the connection section, the above-described embodiment with a generally rectangular configuration is more convenient than this modified structure.

BRIEF EXPLANATION OF THE DRAWINGS

FIG. 1 shows a connection section between a drive arm and a rod member of a power back door, along with an opening via which the connection section passes.

Figure 1A:
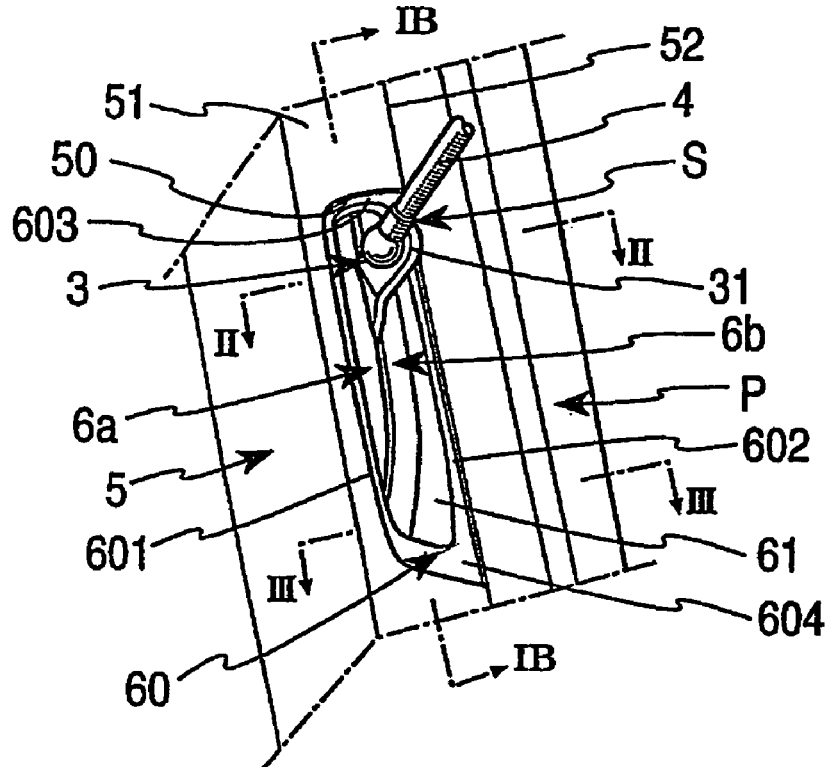
FIG. 1(A) is a perspective view of a main part thereof.
Figure 1B:
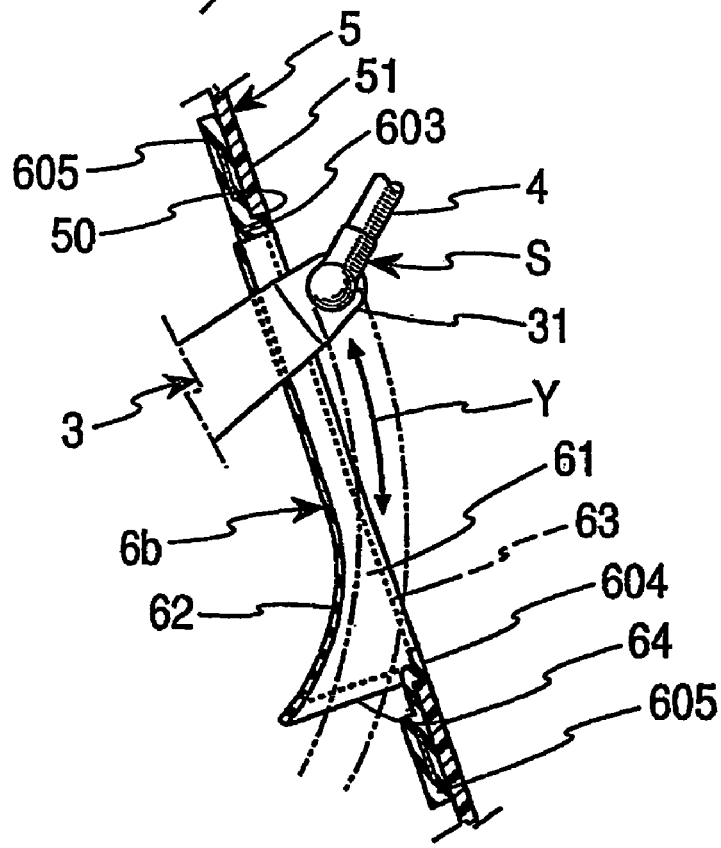
FIG. 1(B) is a sectional view taken along line IB-IB of FIG. 1(A).
Figure 2:
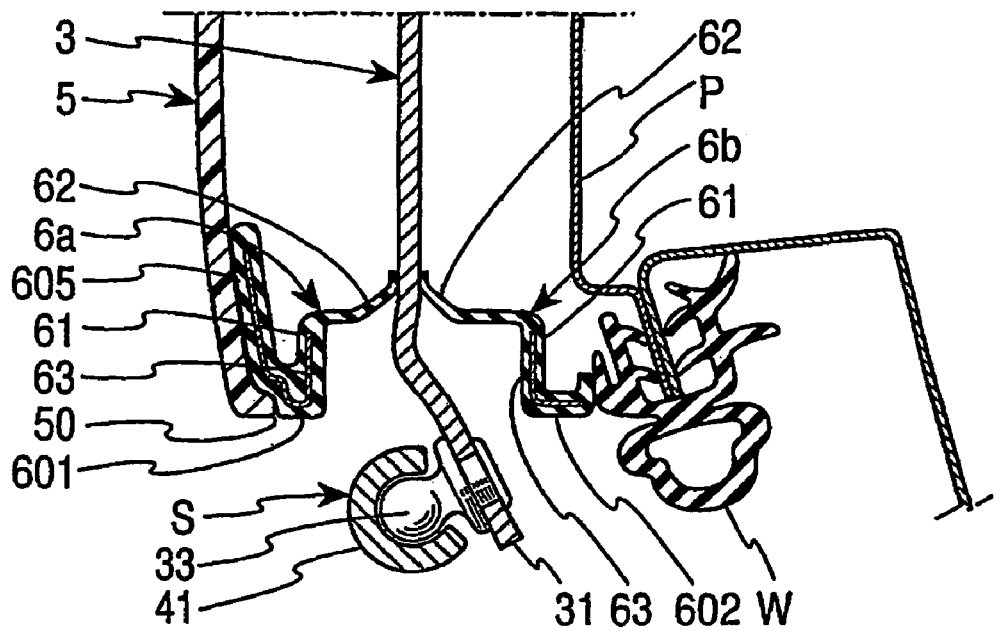
FIG. 2 is a sectional view taken along line II-II of FIG. 1(A).
Figure 3:
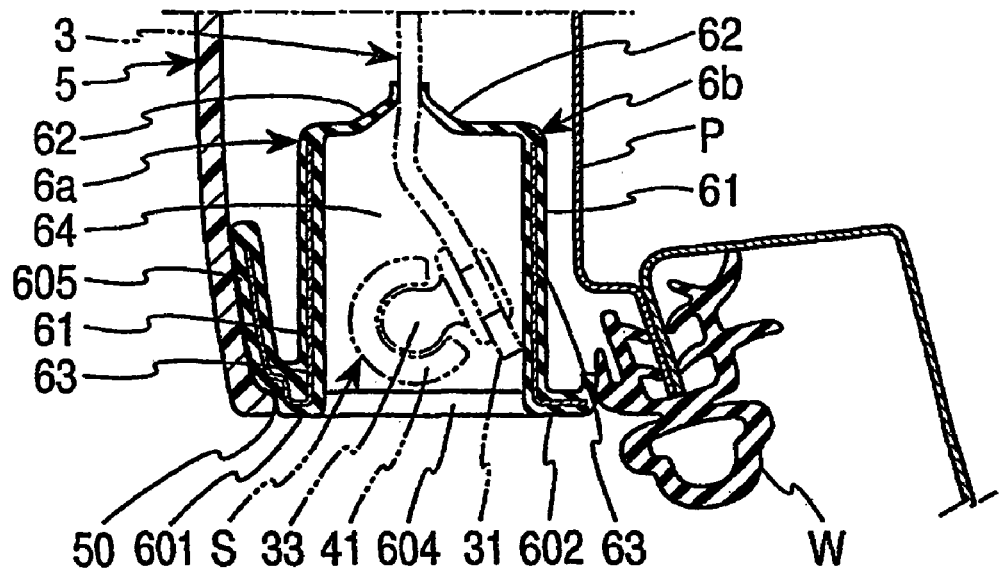
FIG. 3 is a sectional view taken along line III-III of FIG. 1(A).
Figure 4:
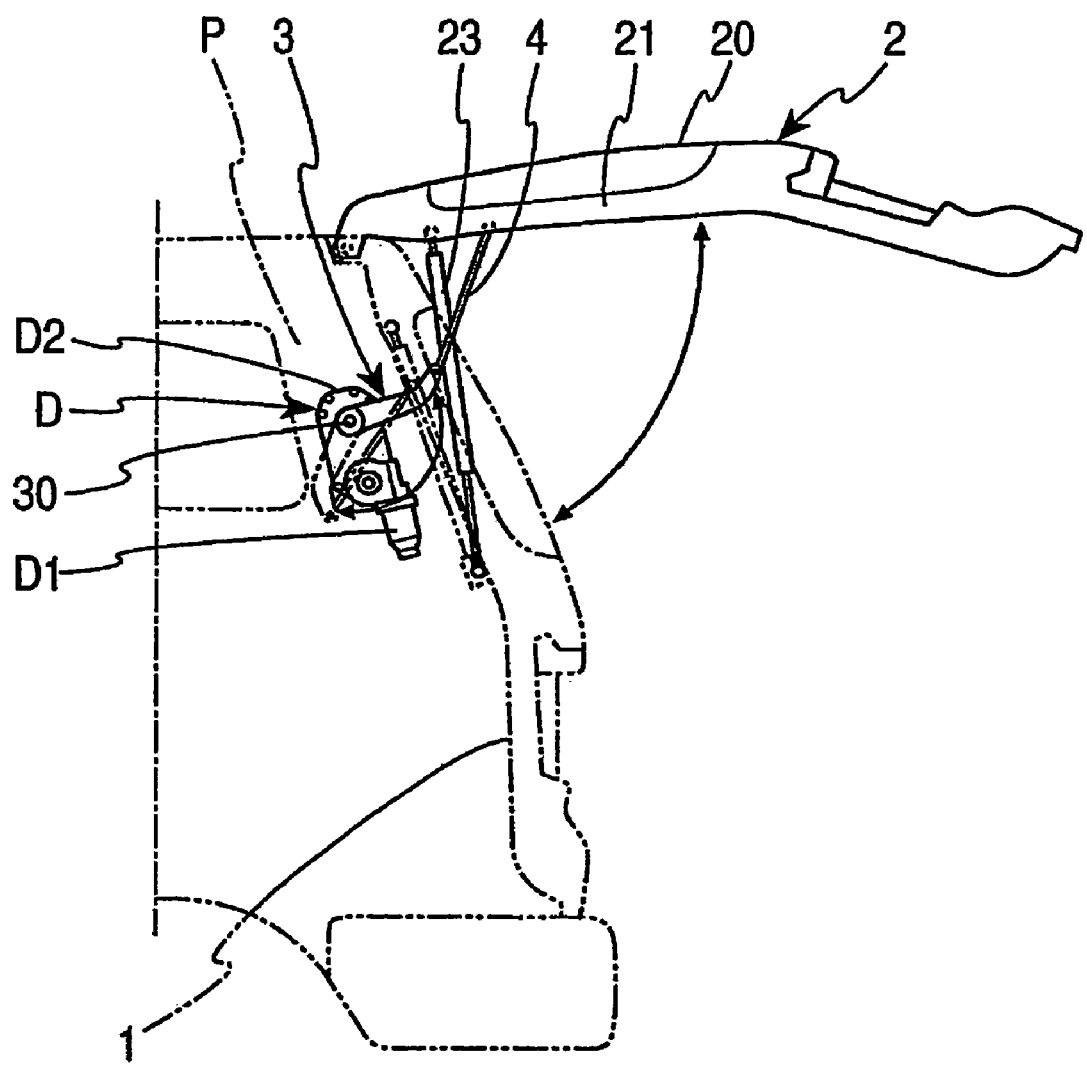
FIG. 4 is a side view showing a power back door of a wagon vehicle, SUV, etc.
Figure 5:
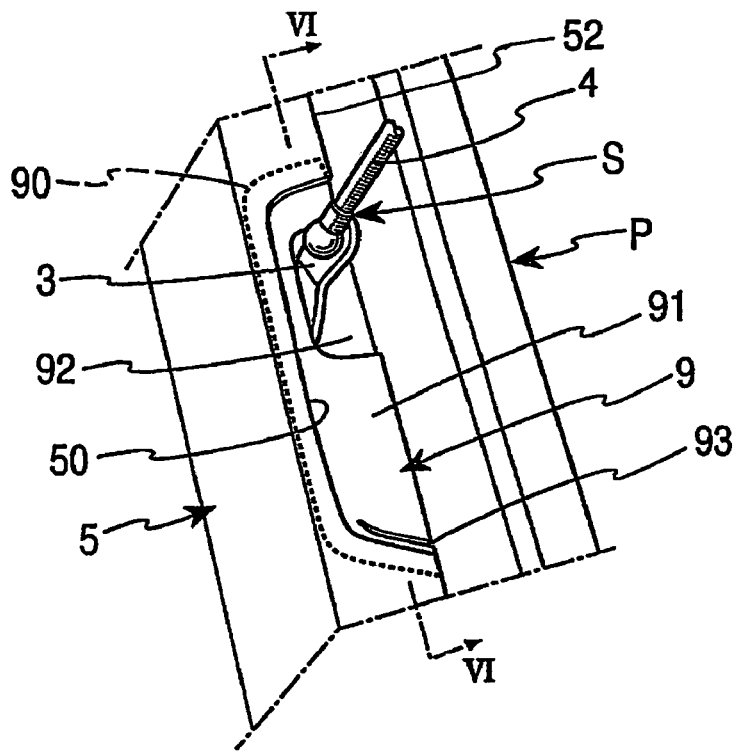
FIG. 5 is a perspective view corresponding to FIG. 1, which shows a connection section between a drive arm and a rod member of a conventional power back door, along with an opening via which the connection section passes.
Figure 6:
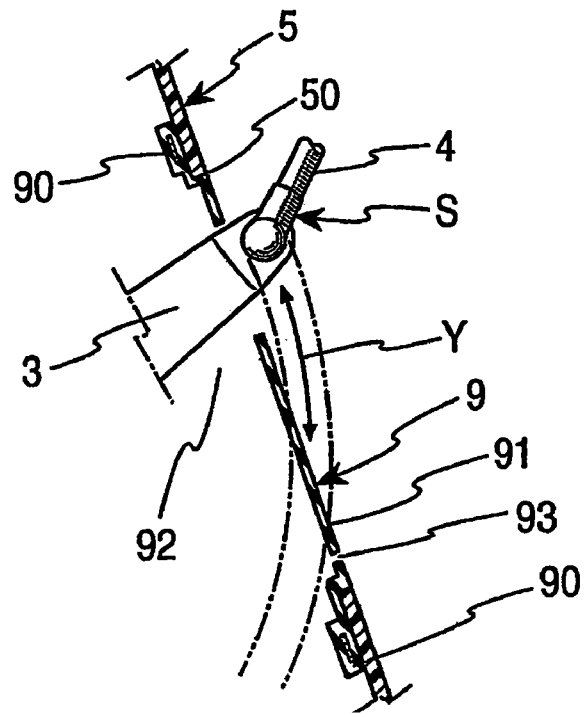
FIG. 6 is a sectional view taken along line VI-VI of FIG. 5.

EXPLANATION OF REFERENCE CHARACTERS 1 door opening
2 back door
3 drive arm 31 end
4 rod
5 pillar garnish
50 opening
6*a*, 6*b* cover member
61 base part
62 lip part
63 metal core
64 entrance/exit opening
D drive device
P rear pillar
S connection section

The invention claimed is:

1. A power back door for a vehicle, in which a hatchback-type back door for opening and closing a door opening provided in a back surface of a vehicle body is automatically driven with a drive device, the power back door being connected to the drive device with a drive arm that is turned upwardly and downwardly by the drive device and a rod that is tiltably connected to an end of the drive arm, and when the door is opened and closed, a connection section between the drive arm and the rod entering and exiting from a vertically long opening formed in a side edge defining the door opening, wherein a pair of cover members, each having a lip-shaped end edge, are provided along right and left vertical edges of the vertically long opening such that lip-shaped end edges of said cover members face and contact each other, said cover members being gradually expanded in width so that they have a greater width on the lower side thereof, a contacting position of said end edges of said cover members shifts downwardly and inwardly of said vertically long opening, and an entrance/exit opening through which the connection section enters and exits is formed with lower edges of expanded sections of said cover members.

2. A power back door for a vehicle, as claimed in claim 1, wherein lower halves of said cover members are gradually expanded in width so that they have a greater width on the lower side thereof, and said entrance/exit opening is formed between said lower edges of said lower halves of said cover members and a lower edge of said vertically long opening.

3. A power back door for a vehicle, as claimed in claim 2, wherein said cover members respectively have a base part that is attached along each of the right and side vertical edges of the vertically long opening to extend inwardly of the vertically long opening in parallel to each other, and a lip part that bends from an end edge of said base part and extends so as to face each other, thereby defining a generally L-shaped cross-section, said base parts in said lower halves of said cover members gradually expanded in width toward said lower edges of said cover members, and said entrance/exit opening width a generally rectangular configuration is formed between said lower edges of said cover members and said lower edge of said vertically long opening.

4. A power back door for a vehicle, as claimed in one of claims 1 through 3, wherein said cover members are composed of an elastic rubber material, and metal cores adapted to hold a configuration of said base parts are embedded in said base parts.

* * * * *